US012683278B2

(12) United States Patent
Zhang et al.

(10) Patent No.: US 12,683,278 B2
(45) Date of Patent: Jul. 14, 2026

(54) INVERTED F-SHAPED ANTENNA FOR HEARING INSTRUMENTS

(71) Applicant: Starkey Laboratories, Inc., Eden Prairie, MN (US)

(72) Inventors: Yali Zhang, Eden Prairie, MN (US); Joseph Matthias Reis, Jr., Minneapolis, MN (US); Gregory John Haubrich, Champlin, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 37 days.

(21) Appl. No.: 18/791,338

(22) Filed: Jul. 31, 2024

(65) Prior Publication Data

US 2025/0062536 A1 Feb. 20, 2025

Related U.S. Application Data

(60) Provisional application No. 63/520,466, filed on Aug. 18, 2023.

(51) Int. Cl.
*H01Q 9/04* (2006.01)
*H01Q 1/27* (2006.01)
(Continued)

(52) U.S. Cl.
CPC ........... *H01Q 9/0421* (2013.01); *H01Q 1/273* (2013.01); *H01Q 1/48* (2013.01); *H04R 25/554* (2013.01);
(Continued)

(58) Field of Classification Search
CPC ............ H01Q 1/273; H01Q 1/36; H01Q 1/48; H01Q 9/0421
See application file for complete search history.

(56) References Cited

U.S. PATENT DOCUMENTS 10,477,329 B2 11/2019 Polinske et al.
11,011,845 B2 * 5/2021 Flood .................... H01Q 1/273
(Continued)

FOREIGN PATENT DOCUMENTS

EP 3316598 A1 * 5/2018 ........... H04R 25/554
EP 3454415 A1 3/2019

OTHER PUBLICATIONS

Ruaro et al., "Wearable Shell Antenna for 2.4 GHz Hearing Instruments", IEEE Transactions on Antennas and Propagation, vol. 64, No. 6, Jun. 2016, 9 pp.

(Continued)

*Primary Examiner* — Hoang V Nguyen
(74) *Attorney, Agent, or Firm* — Shumaker & Sieffert, P.A.

(57) ABSTRACT

An antenna for a hearing instrument comprises an antenna element that is fed at an intermediate point between a first end of the antenna element and a second end of the antenna element. The antenna element has a J-shaped surface. The antenna also includes a ground plane element, a dielectric structure, and a shorting structure. The ground plane element that has a first segment and a second segment. A surface of the first segment has substantially the same shape as the J-shaped surface of the antenna element. The second segment connects a first end of the first segment to a second end of the first segment, thereby defining an opening through the ground plane element. The dielectric structure is disposed between the antenna element and the ground plane element. The shorting structure connects the first end of the antenna element to the ground plane element.

24 Claims, 14 Drawing Sheets

(51) Int. Cl.
*H01Q 1/48* (2006.01)
*H04R 25/00* (2006.01)

(52) U.S. Cl.
CPC ....... *H04R 25/609* (2019.05); *H04R 2225/51* (2013.01)

(56) References Cited

U.S. PATENT DOCUMENTS

| | | | | |
|---|---|---|---|---|
| 2008/0316115 | A1* | 12/2008 | Hill | H01Q 9/0407 343/702 |
| 2016/0183016 | A1* | 6/2016 | Sø | H01Q 1/273 381/315 |
| 2019/0006741 | A1 | 1/2019 | Riisberg | |

OTHER PUBLICATIONS

Extended Search Report from counterpart European Application No. 24193240.9 dated Jan. 2, 2025, 12 pp.
Response to Extended Search Report dated Jan. 2, 2025, from counterpart European Application No. 24193240.9 filed Aug. 14, 2025, 19 pp.

* cited by examiner

INVERTED F-SHAPED ANTENNA FOR HEARING INSTRUMENTS

This application claims the benefit of U.S. Provisional Patent Application 63/520,466, filed Aug. 18, 2023, the entire content of which is incorporated by reference.

TECHNICAL FIELD

This disclosure relates to antennas for hearing instruments.

BACKGROUND

Wearable devices are devices designed to be worn on, in, or near one or more of a user's body. Example types of wearable device may include hearing instruments, smart watches, on-body biometric sensors, media players, augmented or virtual reality headwear, and so on. Hearing instruments are wearable devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or integrated into a user. Some hearing instruments include additional features beyond sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes antenna designs for hearing instruments. As described in this disclosure, an antenna for a hearing instrument includes an antenna element that is fed at an intermediate point between a first end and a second end. The antenna element has a J-shaped surface. Additionally, the antenna includes a ground plane element that has a first segment and a second segment. A surface of the first segment has the same or substantially the same shape as the J-shaped surface of the antenna element. The second segment connects a first end of the first segment to a second end of the first segment, thereby defining an opening through the ground plane element. The antenna also includes a dielectric structure and a shorting structure. The dielectric structure is disposed between the antenna element and the ground plane element. The shorting structure connects the first end of the antenna element to the ground plane element.

In one example, this disclosure describes an antenna for a hearing instrument, the antenna comprising: an antenna element that is fed at an intermediate point between a first end of the antenna element and a second end of the antenna element, wherein the antenna element has a J-shaped surface; a ground plane element that has a first segment and a second segment, wherein: a surface of the first segment has the same or substantially the same shape as the J-shaped surface of the antenna element, and the second segment connects a first end of the first segment to a second end of the first segment, thereby defining an opening through the ground plane element; a dielectric structure disposed between the antenna element and the ground plane element; and a shorting structure that connects the first end of the antenna element to the ground plane element.

In another example, this disclosure describes a hearing instrument comprising an antenna that comprises: an antenna element that is fed at an intermediate point between a first end of the antenna element and a second end of the antenna element, wherein the antenna element has a J-shaped surface; a ground plane element that has a first segment and a second segment, wherein: a surface of the first segment has the same or substantially the same shape as the J-shaped surface of the antenna element, and the second segment connects a first end of the first segment to a second end of the first segment, thereby defining an opening through the ground plane element; a dielectric structure disposed between the antenna element and the ground plane element; and a shorting structure that connects the first end of the antenna element to the ground plane element.

The details of one or more aspects of the disclosure are set forth in the accompanying drawings and the description below. Other features, objects, and advantages of the features and techniques described in this disclosure will be apparent from the description, drawings, and claims.

DETAILED DESCRIPTION

Figure 1:
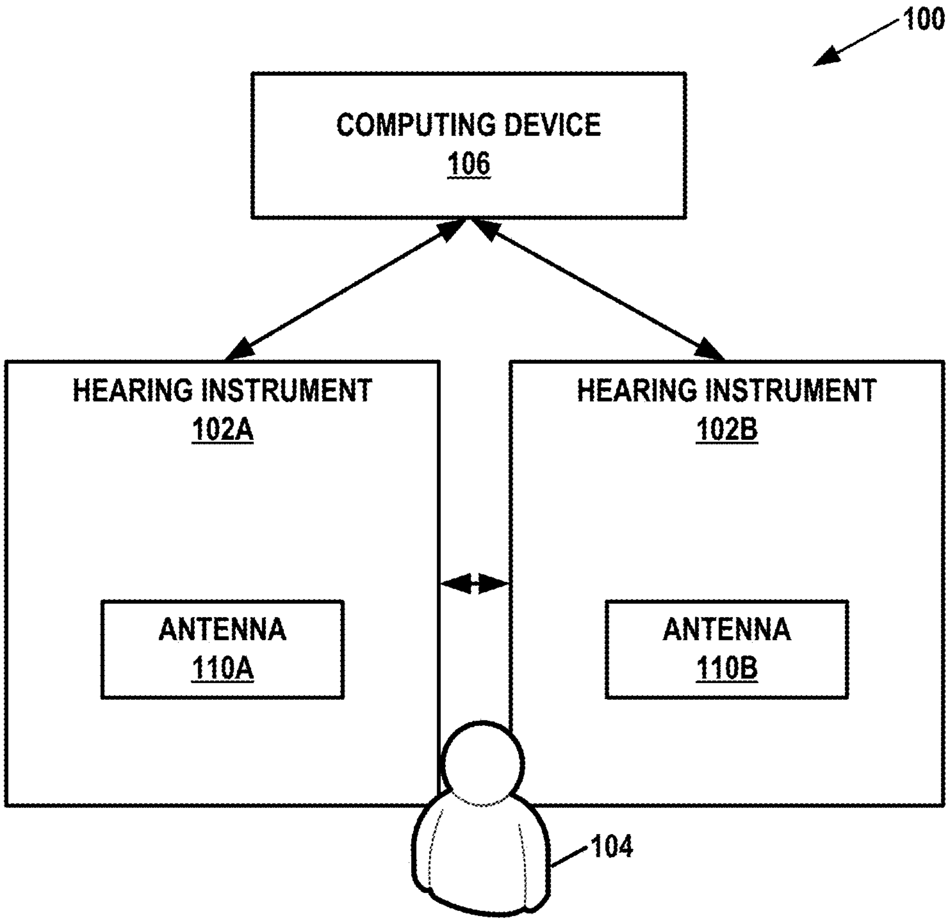
FIG. 1 is a conceptual diagram illustrating an example system that includes one or more hearing instruments, in accordance with one or more aspects this disclosure.

Wireless communication links are becoming an increasingly important aspect of wearable devices, such as hearing instruments. Although much of this disclosure describes hearing instruments, the antennas and antenna designs of this disclosure may be used in other types of wearable devices that include wireless capabilities. A hearing instrument may use wireless communication links to communicate with other hearing instruments or with other types of devices, such as mobile phones or hearing instrument accessories. Such communication may serve a wide variety of purposes, such as streaming media data and sending sensor data.

A hearing instrument may include an antenna to perform wireless communication. In part because of the small sizes of hearing instruments and the limited storage capacities of the batteries of hearing instruments, designing antennas for hearing instruments is challenging. For example, it may be challenging to design an antenna for a hearing instrument that has high performance for two or more of car-to-car communication, on-body communication, and off-body communication. Moreover, it may be impractical because of the size and cosmetic constraints of a hearing instrument for the hearing instrument to include multiple antennas for different types of wireless communication. In this disclosure, car-to-car communication is wireless communication between hearing instruments worn in different cars of a user. On-body communication may include wireless communication with devices that are on the body of a user of the hearing instrument, such as smartphones, smartwatches, wearable devices, on-body sensor devices, and so on. Off-body communication may include wireless communication with devices other than hearing instruments that are not on the user's body, such as accessory devices, Internet of Things (IoT) devices, wireless base stations, and so on.

There are several challenges associated with current designs for antennas in hearing instruments. For example, in-the-car (ITE), in-the-canal (ITC), completely-in-canal (CIC), invisible-in-canal (IIC) hearing instruments commonly include a shell and a faceplate. The shell defines a cavity that contains most or all of the electronic components of the hearing instrument, including a battery that provides electrical energy to other electronic components of the hearing instrument. The faceplate faces outward from the car canal when a user wears the hearing instrument and covers an opening of the shell. The faceplate may define a battery compartment opening through which the battery may be inserted and removed through the faceplate. In many current hearing instrument designs, the battery compartment opening is oriented vertically when the hearing instruments are worn. Orienting the battery compartment opening vertically may limit space available for an antenna. In another example, some current ITE, ITC, CIC, and IIC hearing instruments have antennas that protrude from the faceplate, such as antennas that also serve as pullcords. However, antennas that protrude from the faceplate may not be desirable aesthetically and/or may be prone to damage. In another example, a total radiated power of antennas of many current hearing instrument designs with removable batteries is at most less than 2 decibels (dB) as compared to custom hearing instruments with rechargeable batteries. This may limit the range and effectiveness of the antennas for some purposes. Additionally, it may be a challenge for antennas of current hearing instrument designs to achieve reliable car-to-car communication for a sufficient portion of the population.

This disclosure describes antenna designs that may increase, maintain, or reduce degradation of the performance of a hearing instrument for communication, such as car-to-car communication, on-body communication, and off-body communication, especially for small hearing instruments such as ITE, ITC, CIC, and IIC hearing instruments. For instance, in one example, this disclosure describes an antenna for a hearing instrument. The antenna is configured to send and receive signals that convey data. In general, the antenna is a modified form of a planar inverted-F antenna. The antenna includes an antenna element that is fed at an intermediate point between a first end of the antenna element and a second end of the antenna element. The antenna element has a J-shaped surface. Additionally, the antenna includes a ground plane element that has a first segment and a second segment. A surface of the first segment has the same or substantially the same shape as the J-shaped surface of the antenna element. The second segment connects a first end of the first segment to a second end of the first segment, thereby defining an opening through the ground plane element. The antenna also includes a dielectric structure and a shorting structure. The dielectric structure is disposed between the antenna element and the ground plane element. The shorting structure connects the first end of the antenna element to the ground plane element.

In some examples, a curved portion of the J-shaped antenna element is oriented toward a posterior side of the user's head while a linear portion of the J-shaped antenna element is generally oriented in an anterior-posterior direction. This may allow a battery compartment opening to be oriented horizontally within the faceplate. Orientating the battery compartment opening horizontally within the faceplate may allow more space for an antenna and may make it easier for a user to insert and remove a battery. Additionally, the antennas described in this disclosure do not necessarily require a portion to protrude from the faceplate. The shape, orientation, and design of antennas described in this disclosure may also achieve reliable car-to-car communication for a large portion of the population.

FIG. 1 is a conceptual diagram illustrating an example system 100 that includes hearing instruments 102A, 102B, in accordance with one or more aspects of this disclosure. This disclosure may refer to hearing instruments 102A and 102B collectively, as "hearing instruments 102." A user 104 may wear hearing instruments 102. In some instances, user 104 may wear a single hearing instrument. In other instances, the user may wear two hearing instruments, with one hearing instrument for each car of user 104.

Hearing instruments 102 may comprise one or more of various types of devices that are configured to provide auditory stimuli to user 104 and that are designed for wear and/or implantation at, on, or near an ear of user 104. Hearing instruments 102 may be worn, at least partially, in the car canal or concha. One or more of hearing instruments 102 may include behind the car (BTE) components that are worn behind the cars of user 104. In some examples, hearing instruments 102 comprise devices that are at least partially implanted into or integrated with the skull of user 104. In some examples, one or more of hearing instruments 102 provide auditory stimuli to user 104 via a bone conduction pathway.

In any of the examples of this disclosure, each of hearing instruments 102 may comprise a hearing assistance device.

Hearing assistance devices include devices that help a user hear sounds in the user's environment. Example types of hearing assistance devices may include hearing aid devices, Personal Sound Amplification Products (PSAPs), cochlear implant systems (which may include cochlear implant magnets, cochlear implant transducers, and cochlear implant processors), and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the environment of user 104, such as recorded music, computer-generated sounds, or other types of sounds. For instance, hearing instruments 102 may include so-called "hearables," earbuds, earphones, or other types of devices. Some types of hearing instruments provide auditory stimuli to user 104 corresponding to sounds from the environment of user 104 and also artificial sounds.

In some examples, one or more of hearing instruments 102 may be ITE devices, which include a housing worn within the concha and cymba concha. In some examples, one or more of hearing instruments 102 may be ITC devices, which include a housing worn primarily within the concha. In some examples, one or more of hearing instruments 102 may be CIC device, which include a housing worn primarily within an external portion of the auditory canal. In ITE, ITC, and CIC hearing instruments, a receiver that generates sound is included within the housing of the hearing instruments.

Hearing instruments 102 may implement a variety of features that help user 104 hear better. For example, hearing instruments 102 may amplify the intensity of incoming sound, amplify the intensity of certain frequencies of the incoming sound, attenuate certain frequencies, and/or translate or compress frequencies of the incoming sound. In another example, hearing instruments 102 may implement a directional processing mode in which hearing instruments 102 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wirelessly communication technologies. Example types of wireless communication technology include Near-Field Magnetic Induction (NFMI) technology, a 2.4 GHz technology, a BLUETOOTH™ technology, a WI-FI™ technology, audible sound signals, ultrasonic communication technology, infrared communication technology, an inductive communication technology, or another type of communication that does not rely on wires to transmit signals between devices. In some examples, hearing instruments 102 use a 2.4 GHz frequency band for wireless communication.

As shown in the example of FIG. 1, system 100 may also include a computing device 106. In other examples, system 100 does not include computing device 106. Computing device 106 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices. Accessory devices (not shown in FIG. 1) may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. One or more of hearing instruments 102 may communicate with computing device 106 using wireless or non-wireless communication links. For instance, hearing instruments 102 may communicate with computing device 106 and/or each other using any of the example types of communication technologies described elsewhere in this disclosure. For example, hearing instruments 102 may communicate with computing device 106 and/or each other using antennas conforming to the antenna designs described in this disclosure.

In the example of FIG. 1, hearing instrument 102A includes an antenna 110A and hearing instrument 102B includes an antenna 110B. This disclosure may refer to antenna 110A and antenna 110B collectively as "antennas 110." As described in greater detail below, antenna 110A includes an antenna element that is fed at an intermediate point between a first end and a second end. The antenna element has a J-shaped surface. Additionally, the antenna includes a ground plane element that has a first segment and a second segment. A surface of the first segment has the same or substantially the same shape as the J-shaped surface of the antenna element. The second segment connects a first end of the first segment to a second end of the first segment, thereby defining an opening through the ground plane element. The antenna also includes a dielectric structure and a shorting structure. The dielectric structure is disposed between the antenna element and the ground plane element. The shorting structure connects the first end of the antenna element to the ground plane element. Antenna 110B may be implemented in the same way as antenna 110A.

Figure 2:
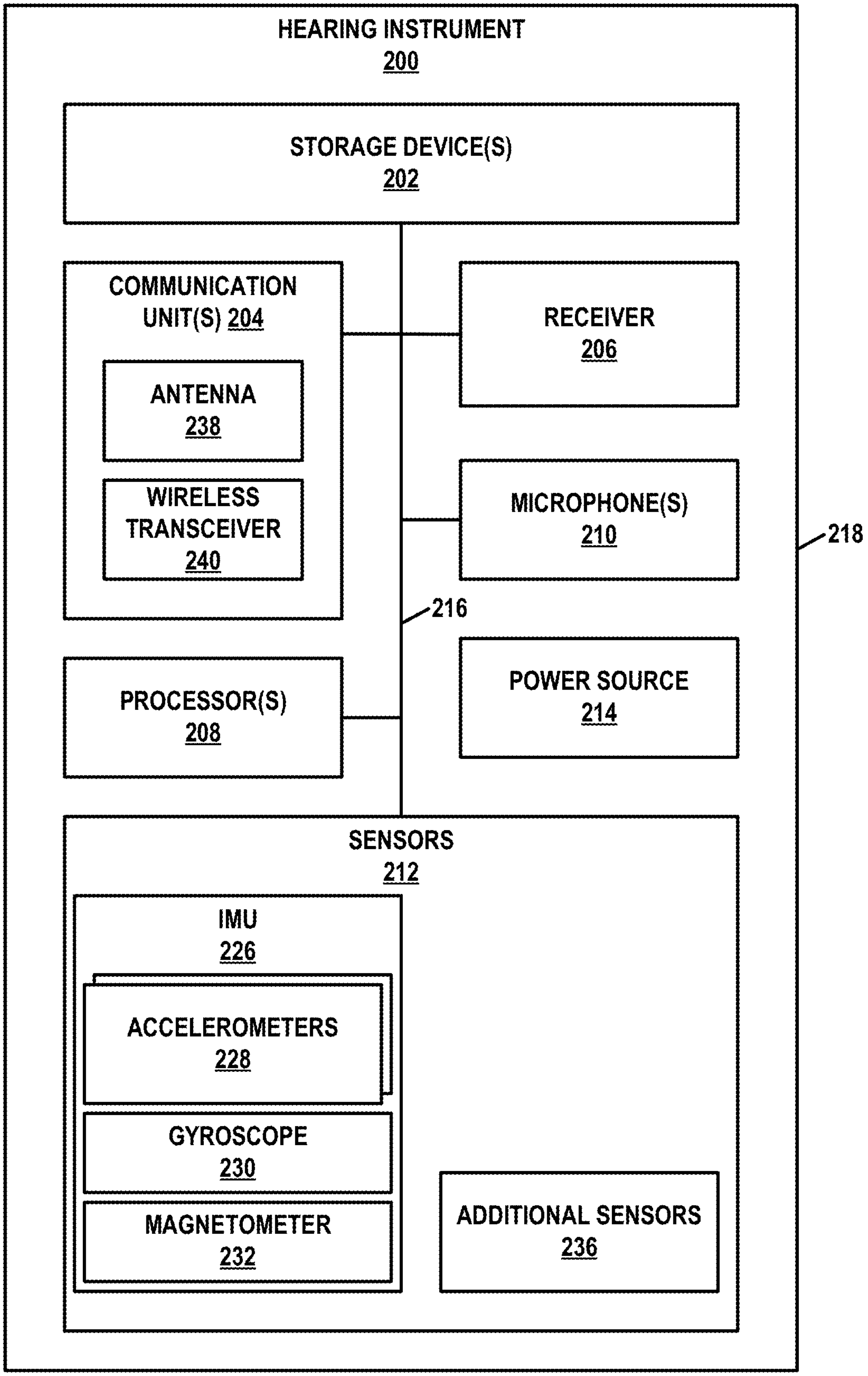
FIG. 2 is a block diagram illustrating example components of a hearing instrument, in accordance with one or more aspects of this disclosure.

FIG. 2 is a block diagram illustrating example components of hearing instrument 200, in accordance with one or more aspects of this disclosure. Hearing instrument 200 may be either one of hearing instruments 102. Each of hearing instruments 102 may include the same components as hearing instrument 200.

In the example of FIG. 2, hearing instrument 200 comprises one or more storage devices 202, one or more communication units 204, a receiver 206, one or more processors 208, one or more microphones 210, a set of sensors 212, a power source 214, and one or more communication channels 216. Communication channels 216 provide communication between storage devices 202, communication units 204, receiver 206, processors 208, one or more microphones 210, and sensors 212. Storage devices 202, communication units 204, receiver 206, processors 208, microphones 210, and sensors 212 may draw electrical power from power source 214. In the example of FIG. 2, each of storage devices 202, communication units 204, receiver 206, processors 208, microphones 210, and sensors 212, power source 214, and communication channels 216 may be contained within a single housing 218.

Furthermore, in the example of FIG. 2, sensors 212 include an inertial measurement unit (IMU) 226 that is configured to generate data regarding the motion of hearing instrument 200. IMU 226 may include a set of sensors. For instance, in the example of FIG. 2, IMU 226 includes one or more of accelerometers 228, a gyroscope 230, a magnetometer 232, combinations thereof, and/or other sensors for determining the motion of hearing instrument 200. Furthermore, in the example of FIG. 2, hearing instrument 200 may include one or more additional sensors 236. Additional sensors 236 may include a photoplethysmography (PPG) sensor, blood oximetry sensors, blood pressure sensors, electrocardiogramaensors, body temperature sensors, electroencephalography (EEG) sensors, environmental temperature sensors, environmental pressure sensors, environmental humidity sensors, skin galvanic response sensors, and/or other types of sensors. In other examples, hearing instrument 200 and sensors 212 may include more, fewer, or different components.

Storage devices 202 may store data. Storage devices 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage devices 202 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories.

Communication unit(s) 204 may enable hearing instrument 200 to send data to and receive data from one or more other devices, such as another hearing instrument, an accessory device, a mobile device, or another type of device. Communication unit(s) 204 may enable hearing instrument 200 to communicate using wireless or non-wireless communication technologies. For instance, communication unit(s) 204 enable hearing instrument 200 to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 200 to communicate using a cable-based technology, such as a Universal Serial Bus (USB) technology.

As shown in the example of FIG. 2, one or more of communication units 204 include an antenna 238 and a wireless transceiver 240. Antenna 238 may correspond to antenna 110A or 110B in FIG. 1. Wireless transceiver 240 may comprise circuitry configured to generate modulated electrical signals sent to antenna 238 and/or to process electrical signals received from antenna 238.

Antenna 238 may be implemented in accordance with any of the example antenna designs described in this disclosure. For instance, antenna 238 may include an antenna element that is fed at an intermediate point between a first end and a second end. The antenna element has a J-shaped surface. Additionally, antenna 238 includes a ground plane element that has a first segment and a second segment. A surface of the first segment has the same or substantially the same shape as the J-shaped surface of the antenna element. The second segment connects a first end of the first segment to a second end of the first segment, thereby defining an opening through the ground plane element. The antenna also includes a dielectric structure and a shorting structure. The dielectric structure is disposed between the antenna element and the ground plane element. The shorting structure connects the first end of the antenna element to the ground plane element.

As mentioned above, the antenna may have a J-shaped surface. The J-shaped surface may include a linear portion and a hook-shaped portion. In some examples, the hook-shaped portion of the antenna elements includes smoothly curved edges that are not aligned with a linear portion of the antenna element. In other examples, the hook-shaped portion of the antenna elements includes one or more linear segments that are not aligned with the linear portion of the antenna element. In some examples, the hook-shaped portion includes a combination of curved and linear segments. In some examples, a tip of the hook-shaped portion is between 90° and 180° relative to the linear portion of the antenna element. In other examples, the tip of the hook-shaped portion may have other angles relative to the linear portion of the antenna element. The hook-shaped portion of the antenna element may be a high E-field portion of the antenna.

In some examples, such as examples where hearing instrument 200 is a CIC hearing instrument or an IIC hearing instrument, antenna 238 may further include an electrically conductive element in a hearing device removal handle. The hearing device removal handle may extend outwardly from a faceplate of hearing instrument 200. This electrically conductive element may be connected to the hook-shaped (e.g., curved) portion of the antenna element. The electrically conductive element in the removal handle may serve to shorten the size of the hook-shaped portion of the antenna element, which may be especially convenient for CIC and IIC hearing instruments. These examples may be applied with respect to any other description of antennas provided elsewhere in this disclosure.

Receiver 206 comprises one or more speakers for generating audible sound. Microphones 210 detects incoming sound and generate one or more electrical signals (e.g., an analog or digital electrical signal) representing the incoming sound.

Processors 208 may be processing circuits configured to perform various activities. For example, processor(s) 208 may process the signal generated by microphones 210 to enhance, amplify, or cancel-out particular channels within the incoming sound. Processors 208 may then cause receiver 206 to generate sound based on the processed signal. In some examples, processors 208 include one or more digital signal processors (DSPs). In some examples, processors 208 may cause communication units 204 to transmit one or more of various types of data. For example, processors 208 may cause communication units 204 to transmit data to computing device 106. In some examples, processors 208 may cause communication units 204 to transmit data to another hearing instrument. Furthermore, communication units 204 may receive audio data from computing device 106 and processors 208 may cause receiver 206 to output sound based on the audio data.

Figure 3:
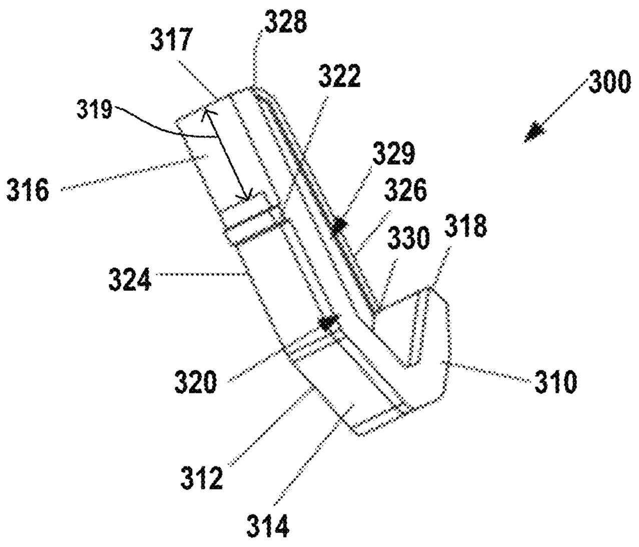
FIG. 3 is a conceptual diagram illustrating example components of an antenna, in accordance with one or more aspects of this disclosure.

FIG. 3 is a conceptual diagram illustrating example components of an antenna 300, in accordance with one or more aspects of this disclosure. Antenna 300 may be an example of antennas 110 or antenna 238. As shown in the example of FIG. 3, antenna 300 includes an antenna element 310, a ground plane element 312, a dielectric structure 314, and a shorting structure 316. Antenna element 310, ground plane element 312, and shorting structure 316 may be formed from a conductive material, such as copper.

Antenna element 310 may be a conductive patch. Antenna element 310 is generally planar and has first end 317 and a second end 318. Antenna element 310 has a J-shaped surface 320. In other words, a surface of antenna element 310 may have a linear portion and a curved or hook-shaped portion. Antenna element 310 may be fed at an intermediate point 322 between first end 317 of antenna element 310 and a second end 318 of antenna element 310. For instance, a feedline may be connected a wireless transceiver 240 (FIG. 2) and intermediate point 322. In some examples, a positive feeding site of antenna is located at intermediate point 322 and a negative feeding site of antenna is located on ground plane element 312. In some examples, a distance between intermediate point 322 and shorting structure 316 is selected to obtain a given resistance, such as 50 Ohm matching.

Ground plane element 312 includes a first segment 324 and a second segment 326. A surface of first segment 324 of ground plane element 312 may have the same or substantially the same shape as the J-shaped surface 320 of antenna element 310. For instance, the surface of the first segment may exactly match the shape of J-shaped surface 320 or may extend beyond a profile of antenna element 310 in one or more locations without impacting antenna performance. Second segment 326 connects a first end 328 of first segment 324 to a second end 330 of first segment 324. In this way, first segment 324 and second segment 326 define an opening 329 through ground plane element 312. Second segment 326 may also be referred to as a "shorting bar." It has been observed that if second segment 326 is broken, the ear-to-ear performance of antenna 300 is degraded. For instance, in some examples, it has been simulated that if second segment 326 is broken, the ear-to-ear performance of antenna 300 is degraded by 10 dB. Additionally, it is observed that degradation of the performance of antenna 300 may also occur if second segment 326 is too close (e.g., less than 1 millimeter (mm)) to a battery or other metallic structures of the hearing instrument, or if second segment 326 is too long (e.g., greater than 21.5 mm). Thus, a length of second segment 326 may be a trade-off between maintaining adequate distance from the battery and minimizing the length of second segment 326.

A thickness of antenna element 310 may be greater than a thickness of ground plane element 312. For example, the thickness of antenna element 310 may be 0.5 mm, 1 mm, or another thickness. In some examples, the thickness of the hook-shaped portion of antenna element 310 correlates with the electrical length and radiation efficiency of antenna 300. For instance, if the hook-shaped portion of antenna element 310 is thinner, a resonant frequency of antenna 300 may shift to a higher frequency and radiation efficiency may decrease. The same applies with respect to the thickness of ground plane element 312.

Dielectric structure 314 is disposed between antenna element 310 and ground plane element 312. Dielectric structure 314 may alter the electrical length of antenna 300 relative to the physical length of antenna 300. For instance, if dielectric structure 314 includes a dielectric material with a higher dielectric constant and/or greater thickness, the physical length of antenna 300 may be shorter while maintaining the same electrical length. Thus, in some examples, a dielectric material may be selected such that for a required physical size of antenna 300, an electrical length of antenna 300 is ¼ wavelength of a given frequency (e.g., 2.4 GHz). For instance, a dielectric material with a relative high dielectric constant may be used in antennas for CIC and IIC hearing instruments. In some examples, dielectric structure 314 is formed from a TMMi10i material available from Rogers Corporation. In some examples where dielectric structure 314 is formed from the TMMi10i material, dielectric structure 314 has a thickness of 2.54 millimeters (mm). In other example, dielectric structure 314 may be formed from other materials and may have other thicknesses.

In the example of FIG. 3, shorting structure 316 connects first end 317 of antenna element 310 and a first end 328 of ground plane element 312. Shorting structure 316 may be created using edge plating. In other words, shorting structure 316 may have the form of one or more metallic plates, e.g., as shown in FIG. 3. In other examples, shorting structure 316 may include one or more shorting vias (e.g., pins). A length 319 of shorting structure 316 may be related to antenna performance. For example, as the length 319 of shorting structure 316 increases, there is more area for current to flow through shorting structure 316 and therefore higher radiation efficiency can be provided.

Figure 4:
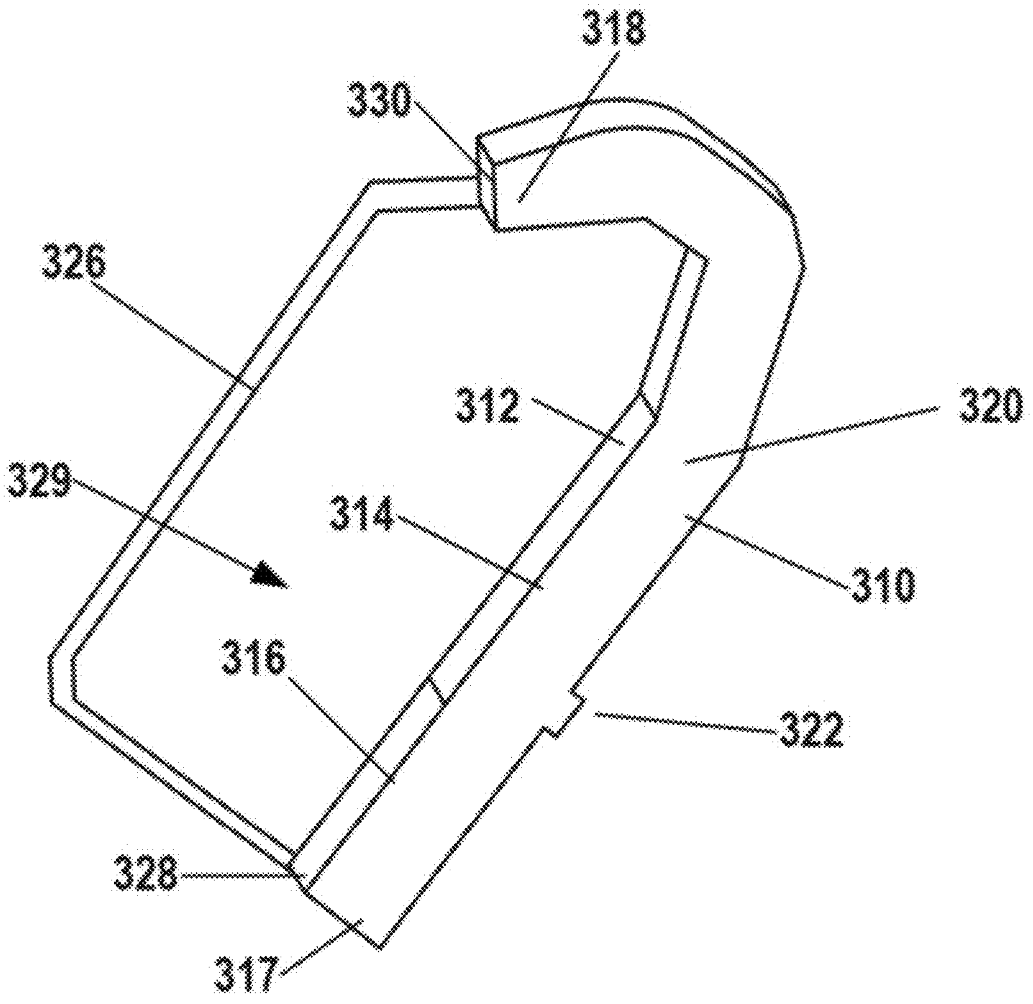
FIG. 4 is a conceptual diagram illustrating a top view of the example antenna, in accordance with one or more aspects of this disclosure.

FIG. 4 is a conceptual diagram illustrating a view of the example antenna 300 from a direction though antenna 300 from antenna element 310 toward ground plane element 312. As one can see in the example of FIG. 4, there may be a shorting structure that connects antenna element 310 and ground plane element 312 across a surface of dielectric structure 314 that faces opening 329.

Figure 5:
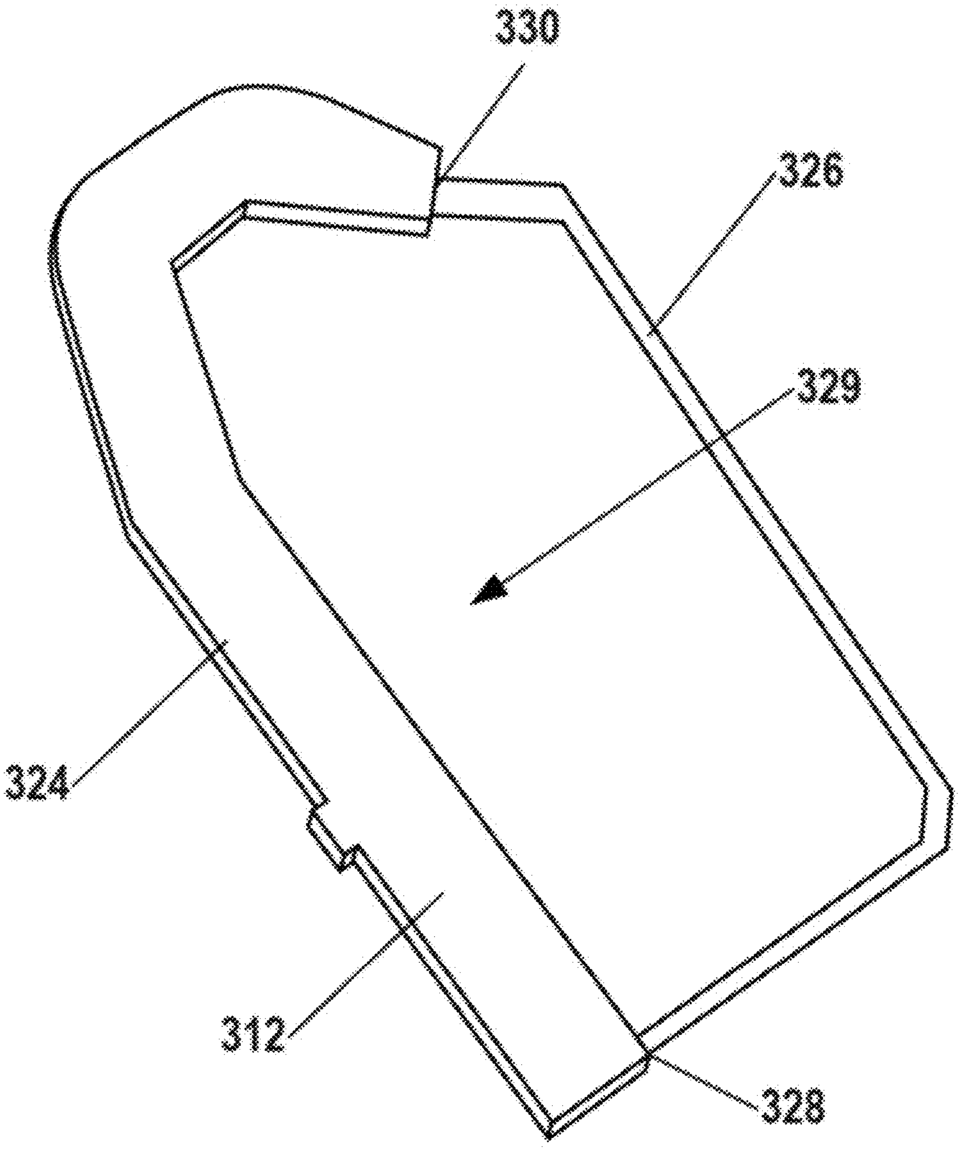
FIG. 5 is a conceptual diagram illustrating a bottom view of the example antenna, in accordance with one or more aspects of this disclosure.

FIG. 5 is a conceptual diagram illustrating a view of the example antenna 300 from a direction through antenna 300 from ground plane element 312 toward antenna element 310. As shown in the example of FIG. 5, ground plane element 312 includes first segment 324 and second segment 326.

Figure 6:
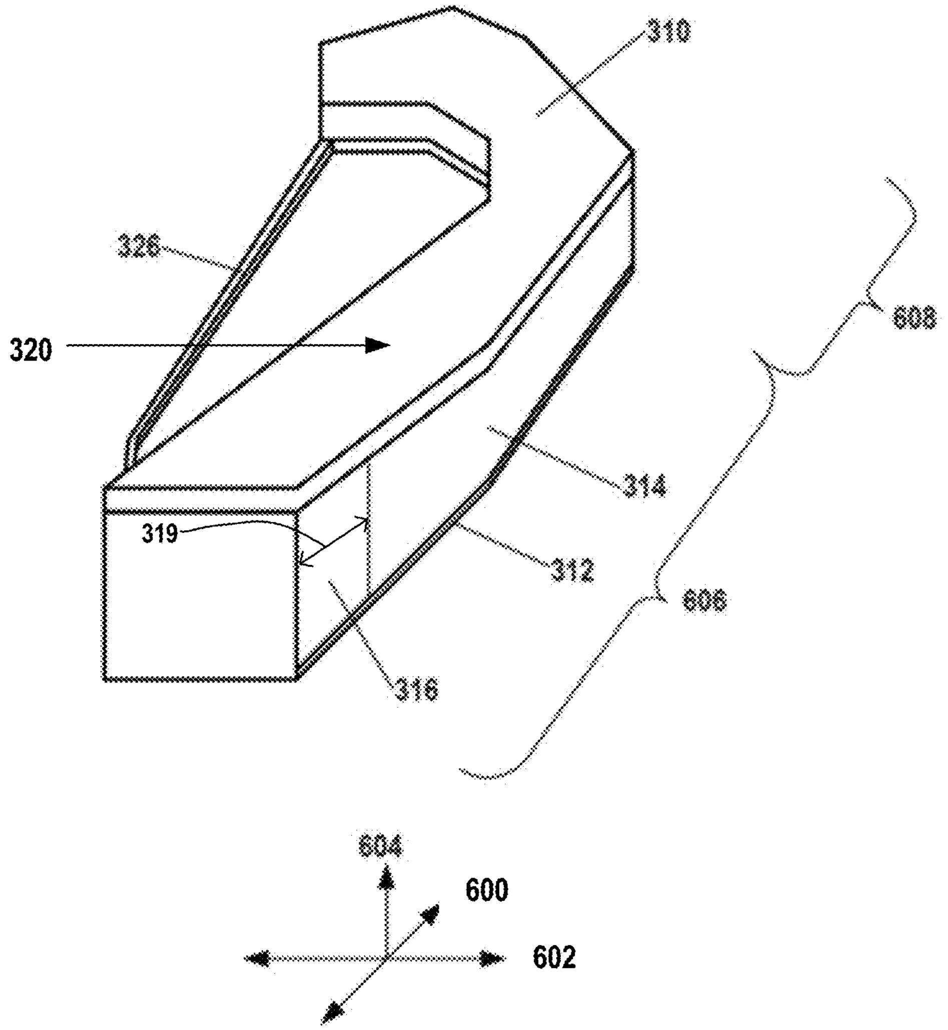
FIG. 6 is a conceptual diagram illustrating another view of the example antenna, in accordance with one or more aspects of this disclosure.

FIG. 6 is a conceptual diagram illustrating another view of example antenna 300, in accordance with one or more aspects of this disclosure. As shown in the example of FIG. 6, antenna element 310 extends along a longitudinal axis 600 and a lateral axis 602 and is orthogonal to a vertical axis 604. Longitudinal axis 600 and lateral axis 602 define a plane of antenna element 310. As shown in FIG. 6, the J-shaped surface 320 of antenna element 310 lies within the plane of antenna element 310. A linear portion 606 of antenna element 310 is primarily aligned with longitudinal axis 600 (i.e., an axis of a longer dimension of antenna element 310) and the hook-shaped portion 608 of antenna element 310 deviates from an edge of the linear portion in the lateral axis 602. Vertical axis 604 is orthogonal to the plane of antenna element 310. Furthermore, as shown in FIG. 6, ground plane element 312 is separated from antenna element 310 by dielectric structure 314. In the example of FIG. 6, shorting structure 316 is shown as a plate having a length 319 along a side of dielectric member 314. In other examples, shorting structure 316 may be replaced with one or more vias. In some examples, shorting structure 316 may be implemented using edge plating techniques in which a conductive material (e.g., copper) is disposed within vias through dielectric member 314 and also along exterior edges of dielectric member 314 connecting antenna element 310 and ground plane element 312.

Thus, J-shaped surface 320 of antenna element 310 may lie within a plane of antenna element 310 defined by longitudinal axis 600 and lateral axis 602. Longitudinal axis 600 may correspond to a longer dimension of antenna element 310 and lateral axis 602 is perpendicular to longitudinal axis 600. A hook-shaped portion 608 of J-shaped surface 320 deviates from an edge of a linear portion 606 of J-shaped surface 320 along lateral axis 602. The boundary between linear portion 606 and hook-shaped portion 608 may or may not be well-defined. For instance, there may be a gradual transition between these portions of antenna element 310. Ground plane element 312 is disposed in a plane parallel to the plane of antenna element 310 and displaced from the plane of antenna element 310 along an axis (vertical axis 604) orthogonal to longitudinal axis 600 and lateral axis 602.

Figure 7:
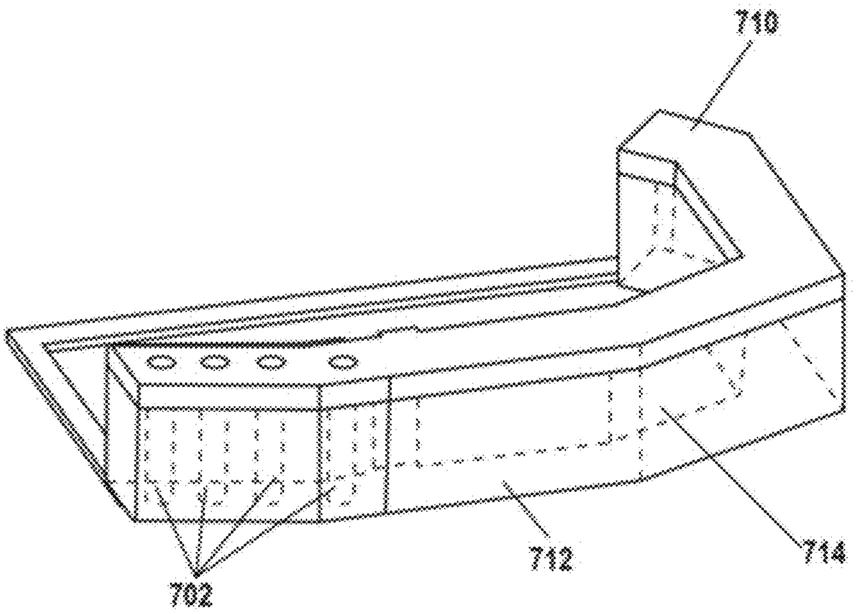
FIG. 7 is a conceptual diagram illustrating a view of an example antenna that includes shorting vias, in accordance with one or more aspects of this disclosure.

FIG. 7 is a conceptual diagram illustrating a view of an example antenna 700 that includes shorting vias 702, in accordance with one or more aspects of this disclosure. Antenna 700 may be implemented in accordance with any of the examples provided elsewhere in this disclosure, e.g., with respect to antenna 300. However, antenna 700 includes one or more shorting vias 702 that traverse dielectric structure 714 from antenna element 710 to ground plane element 712. Vias 702 may include electrically conductive rods. The number of shorting vias 702 may be different in different antennas. In some examples, rather than vias 702 passing through dielectric structure 714, vias 702 may be arranged along an edge of dielectric structure.

Figure 8:
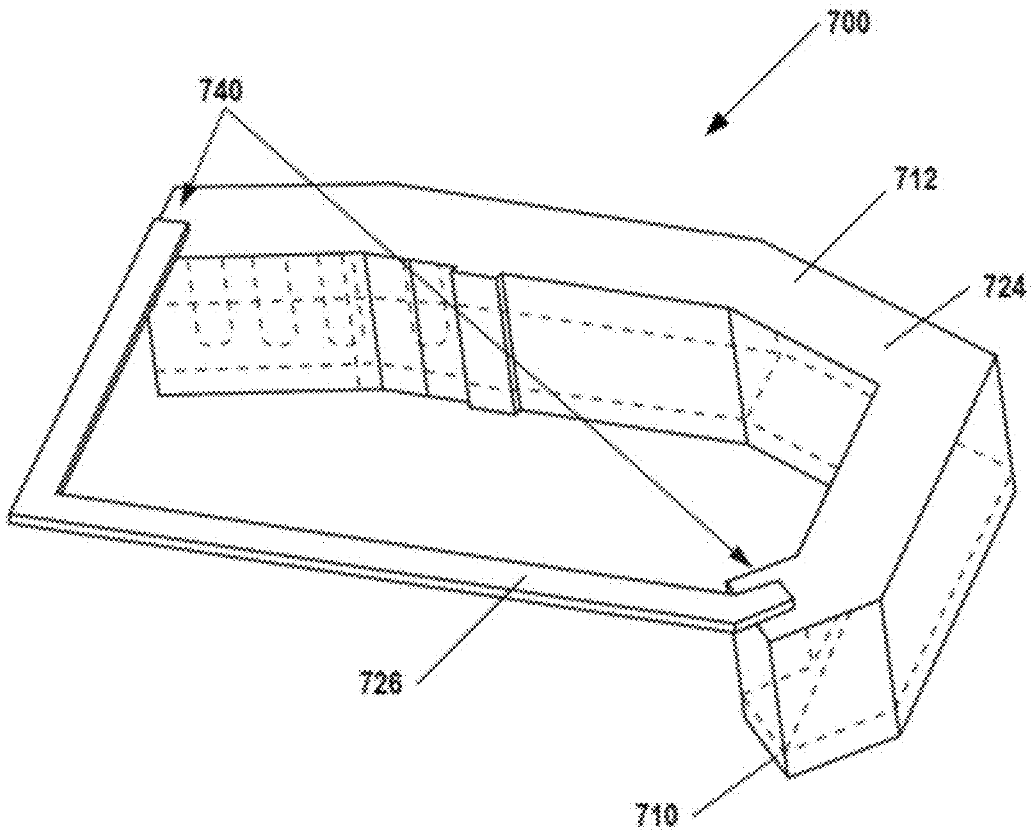
FIG. 8 is a conceptual diagram illustrating a reverse view of the example antenna of FIG. 7, in accordance with one or more aspects of this disclosure.

FIG. 8 is a conceptual diagram illustrating a reverse view of the example antenna 700 of FIG. 7, in accordance with one or more aspects of this disclosure. The example of FIG. 8 illustrates that a first segment 724 and a second segment 726 of ground plane element 712 may initially be separate pieces but be connected at connection points 740. For instance, in some examples, first segment 724 may be soldered to second segment 726 at connection points 740. In other examples, first segment 724 and second segment 726 may be connected in other ways. For instance, first segment 724 and second segment 726 may initially be separate flex or sheet metal elements. Connecting first segment 724 and second segment 726 in may make manufacturing easier.

Figure 9:
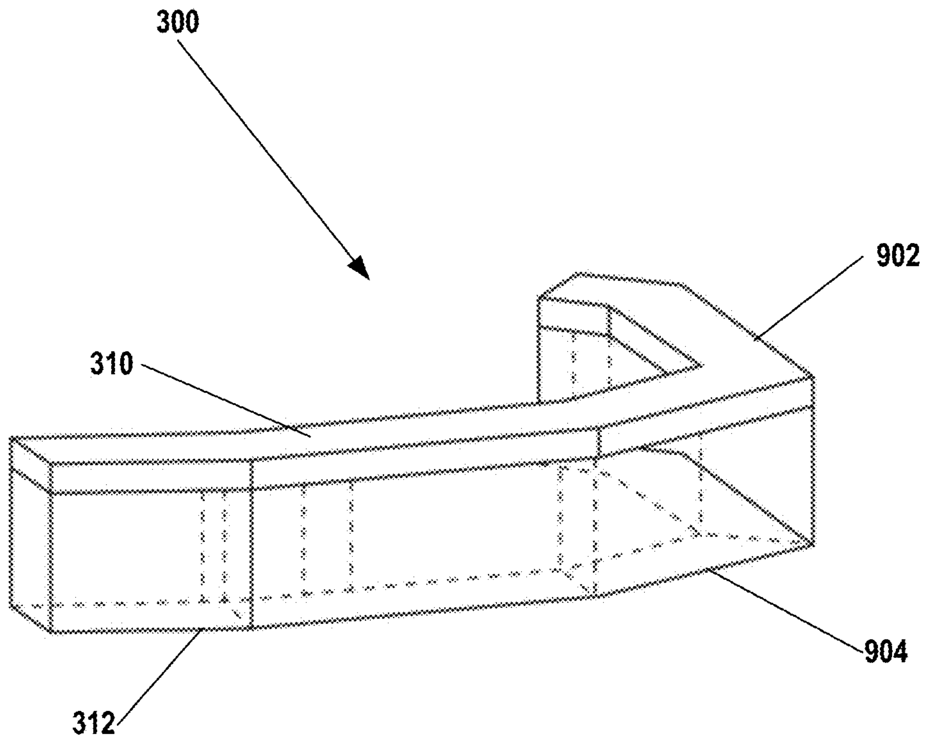
FIG. 9 is a conceptual diagram illustrating an example dielectric and copper layers of an antenna after machining, in accordance with one or more aspects of this disclosure.

FIG. 9 is a conceptual diagram illustrating an example dielectric and copper layers of antenna 300 after machining, in accordance with one or more aspects of this disclosure. In the example of FIG. 9, antenna element 310 is formed of a first piece of copper 902 and ground plane element 312 is formed of a second piece of copper 904.

Figure 10:
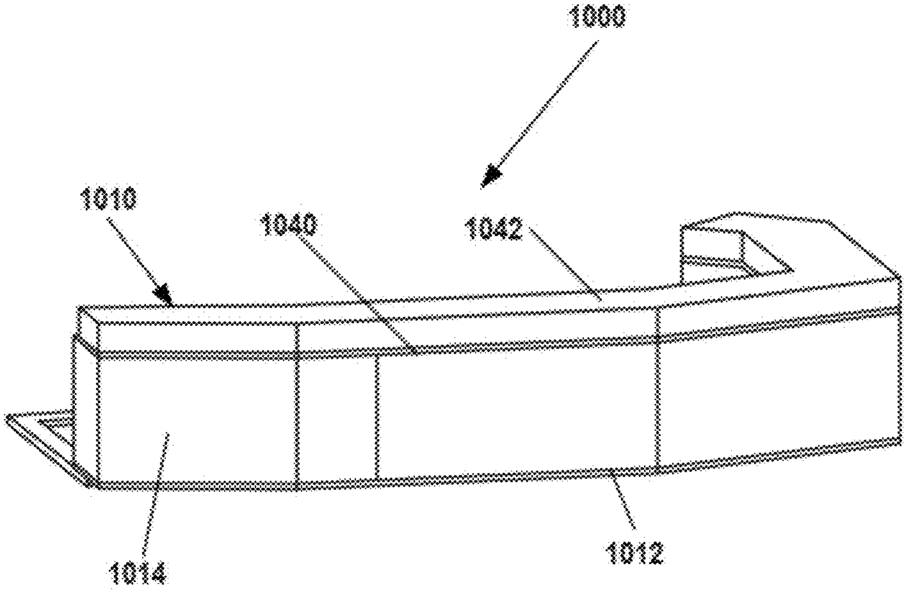
FIG. 10 is a conceptual diagram illustrating an example antenna in which a separate copper layer is added to the antenna element, in accordance with one or more aspects of this disclosure.

FIG. 10 is a conceptual diagram illustrating an example antenna 1000 in which a separate copper layer is added to the antenna element, in accordance with one or more aspects of this disclosure. In general, antenna 1000 may be implemented in accordance with examples described elsewhere in this disclosure. However, in some examples, antenna element 1010 may be formed from two layers of a conducting material, such as copper. For example, a first layer 1040 of antenna element 1010, a shorting structure 1014, and ground plane element 1012 of antenna 1000 may be formed from a single folded piece of conducting material of uniform thickness. As discussed above, thickness of antenna element 1010 relative to the thickness of the ground plane element may have an effect on the electrical length and the radiation efficiency. Accordingly, to increase a total thickness of antenna element 1010, a second layer 1042 may be added to first layer 1040 of antenna element 1010, thereby increasing the thickness of antenna element 1010. Thus, antenna element 1010 may include a first layer 1040 having a same thickness as ground plane element 1012 and a second layer 1042 connected to first layer 1040, wherein second layer 1042 increases a total thickness of antenna element 1010.

Figure 11:
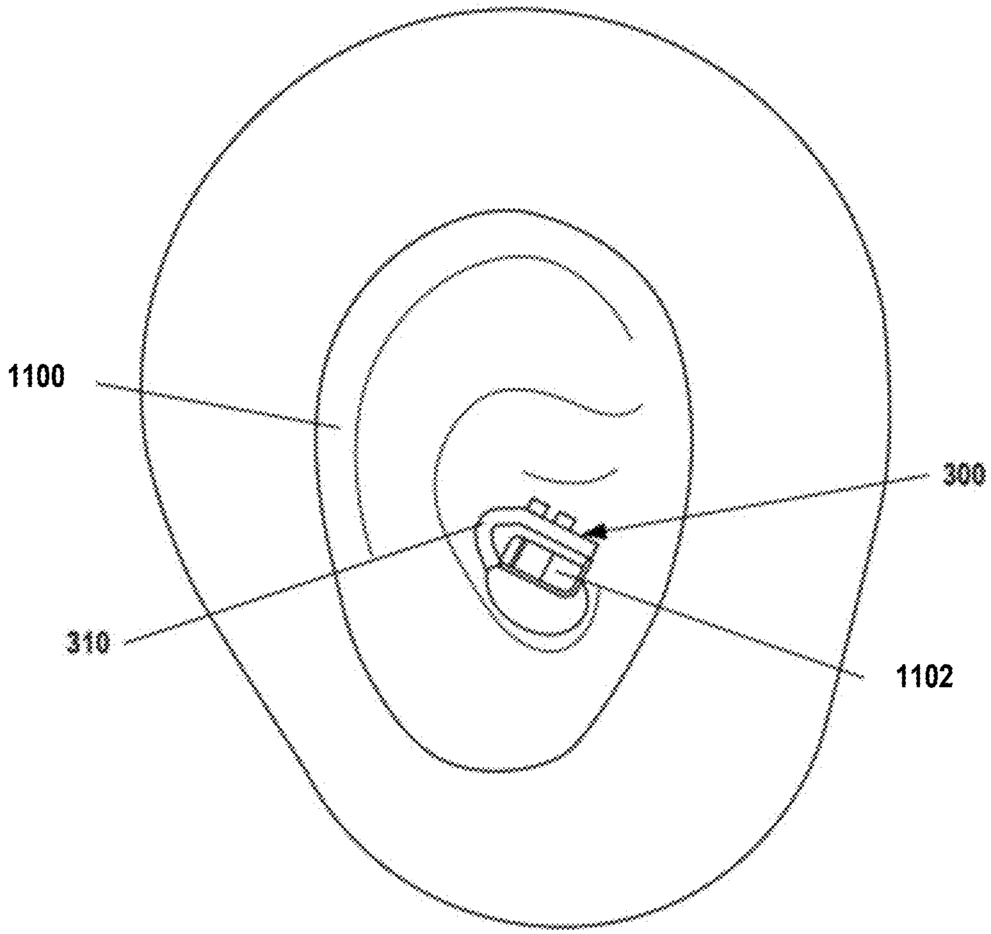
FIG. 11 is a conceptual diagram illustrating an example view of the antenna as worn in an ear of a user, in accordance with one or more aspects of this disclosure.

FIG. 11 is a conceptual diagram illustrating a view of example antenna 300 as worn in an ear 1100 of a user, in accordance with one or more aspects of this disclosure. In order to show the positions of internal components of a hearing instrument that includes antenna 300, a shell and/or faceplate of the hearing instrument are not shown in the example of FIG. 11. As shown in the example of FIG. 11, the hearing instrument is positioned in the concha of the user's ear between the tragus and antitragus. At the same time, antenna 300 is maintained at a location away from both the tragus and antitragus to avoid tissue loss. Antenna 300 is oriented such that a curved portion of antenna element 310 is positioned toward the posterior of the user's head. Orienting antenna 300 such that the curved portion of antenna element 310 is positioned toward the posterior of the user's head may enable antenna 300 to more effectively launch creeping waves that travel along the posterior of the user's head to reach a hearing instrument worn in the user's opposite ear. In the example of FIG. 11, a linear (non-curved) portion of antenna element 310 is positioned toward a superior side of the user's head. In other examples, the linear portion of antenna element 310 is positioned toward an inferior side of the user's head.

Furthermore, FIG. 11 shows a battery tray 1102 positioned within opening 329 defined by the ground plane element (not shown in FIG. 11) of antenna 300. Battery tray 1102 is configured to hold a battery that provides electrical energy to the hearing instrument. The battery may be a zinc-air battery or another type of battery.

Figure 12:
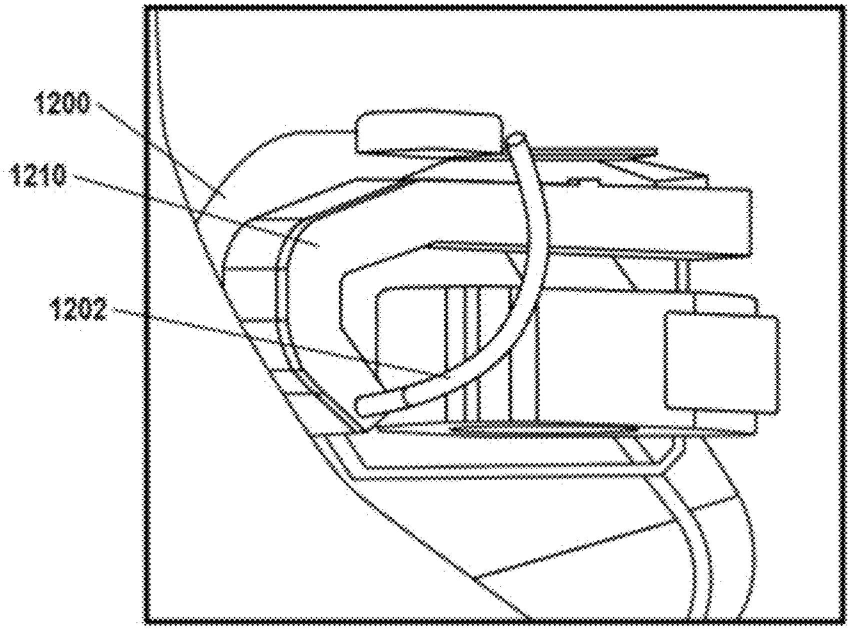
FIG. 12 is a conceptual diagram illustrating a view of an example antenna having a removal handle, in accordance with one or more aspects of this disclosure.

FIG. 12 is a conceptual diagram illustrating a view of an example antenna 1200 having a removal handle, in accordance with one or more aspects of this disclosure. Antenna 1200 may be implemented in accordance with any of the examples described elsewhere in this disclosure, except that antenna 1200 further includes an electrically conductive element 1202 connected to the hook-shaped portion of antenna element 1210. Conductive element 1202 may be at least partially contained within a hearing instrument removal handle that extends outwardly from a faceplate of the hearing instrument. Electrically conductive element 1202 may serve to shorten antenna element 1210.

Figure 13:
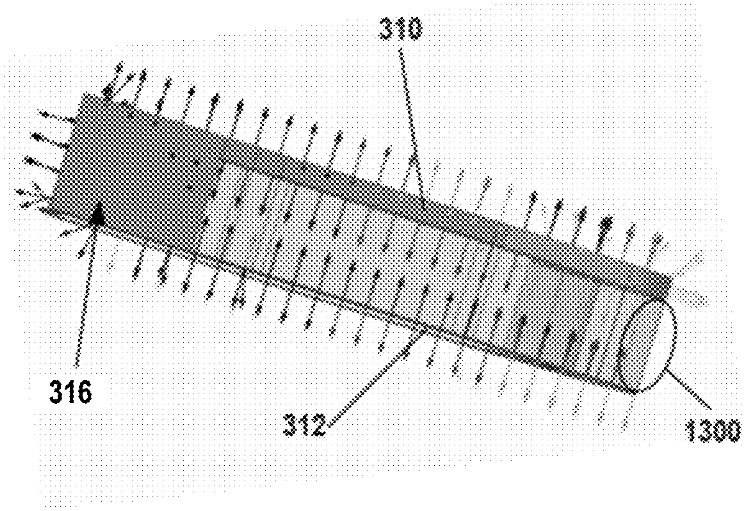
FIG. 13 shows the orientation of E-fields of electromagnetic signals generated by antenna structures of hearing devices in accordance with one or more aspects of this disclosure.

FIG. 13 is a conceptual diagram showing the orientation of E-fields of electromagnetic signals generated by antenna 300 in accordance with one or more aspects of this disclosure. In the example of FIG. 13, arrows indicate the orientation of E-fields of electromagnetic signals generated by antenna 300. As shown in the example of FIG. 13, an E-field direction of antenna 300 may primarily be oriented from ground plane element 312 to antenna element 310 and normal to a head of a user when a hearing instrument that includes antenna 300 is worn by the user.

Arrows 1300 that extend from the curved segment of antenna element 310. The portion of the E-field associated with arrows 1300 may be responsible for launching creeping waves that propagate around the user's head for ear-to-ear communication. The strength of the E-field may be strongest at the hook-shaped portion of antenna 300. The strongest E-field region may be closest to the back of the user's head.

Figure 14:
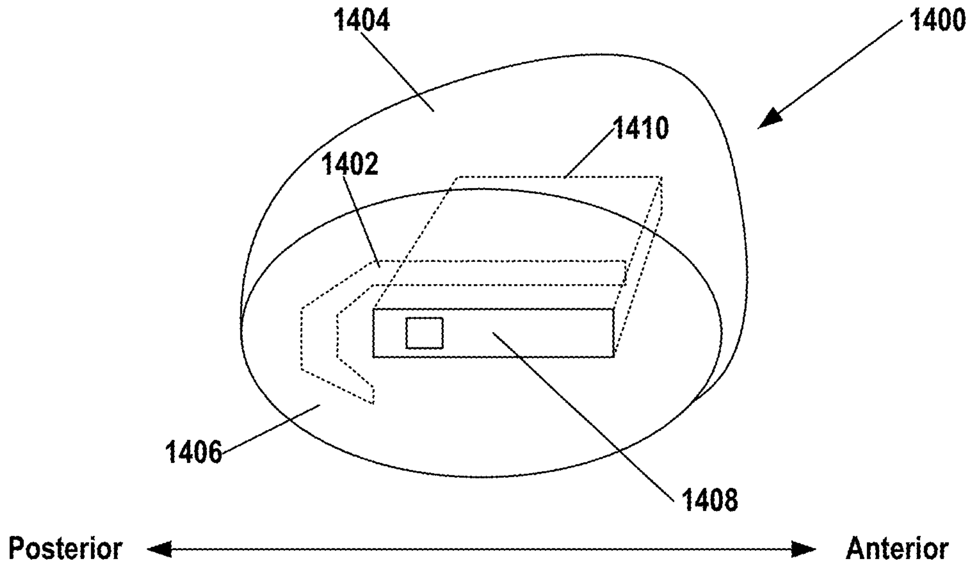
FIG. 14 is a conceptual diagram showing an example hearing instrument in accordance with one or more techniques of this disclosure.

FIG. 14 is a conceptual diagram showing an example of hearing instrument 1400 in accordance with one or more techniques of this disclosure. Hearing instrument 1400 may be an example of hearing instrument 102, 102, or 200. As shown in the example of FIG. 14, hearing instrument 1400 includes a shell 1404 that defines an enclosure in which an antenna 1402 and other components (e.g., a receiver, processors, transceiver, storage devices, microphones, etc. are positioned. Antenna 1402 may be an example of antenna 110, 238, or 300. In some examples, shell 1404 is customized to a shape of an ear and/or ear canal of a user. In other examples, shell 1404 has a generic shape that is not specific to an individual user.

A faceplate 1406 is coupled to shell 1404 and covers an opening of shell 1404. A battery compartment door 1408 is connected to faceplate 1406. Battery compartment door 1408 is configured to provide access to a battery compartment 1410 of hearing instrument 1400. Battery compartment 1410 is defined such that a battery is insertable into battery compartment 1410 though an opening (e.g., opening 329) defined by a ground plane element of antenna 1402. When the battery is inserted into battery compartment 1410, electrical contact members may connect the battery to internal circuitry of hearing instrument 1400.

As shown in the example of FIG. 14, none of antenna 1402 protrudes out from faceplate 1406. Because none of antenna 1402 (i.e., no part of antenna 1402) protrudes out from faceplate 1406, hearing instrument 1400 may be less visible. Additionally, because none of antenna 1402 protrudes out from faceplate 1406, antenna 1402 may be less vulnerable to damage.

With reference to antenna 300, "superior" and "inferior" correspond to opposite directions on an axis. The superior direction of the axis is generally upward when a hearing instrument that includes antenna 300 is worn and the inferior direction of the axis is generally downward when the hearing instrument is worn and the user is standing erect. However, the axis is not necessarily straight up or down relative to the transverse axis of the user's body.

The following clauses describe example techniques of this disclosure.

Clause 1. An antenna for a hearing instrument, the antenna comprising:

an antenna element that is fed at an intermediate point between a first end of the antenna element and a second end of the antenna element, wherein the antenna element has a J-shaped surface; a ground plane element that has a first segment and a second segment, wherein: a surface of the first segment has substantially the same shape as the J-shaped surface of the antenna element, and the second segment connects a first end of the first segment to a second end of the first segment, thereby defining an opening through the ground plane element; a dielectric structure disposed between the antenna element and the ground plane element; and a shorting structure that connects the first end of the antenna element to the ground plane element.

Clause 2. The antenna of clause 1, wherein a thickness of the antenna element is greater than a thickness of the ground plane element.

Clause 3. The antenna of any of clauses 1-2, wherein an electrical length of the antenna element is approximately ¼ of a transmission wavelength of the antenna.

Clause 4. The antenna of any of clauses 1-3, wherein a distance between the intermediate point and the shorting structure is selected to obtain 50 Ohm matching.

Clause 5. The antenna of any of clauses 1-4, wherein an electric field direction of the antenna is primarily oriented from the ground plane element to the antenna element and normal to a head of a user when the hearing instrument is worn by the user.

Clause 6. The antenna of any of clauses 1-5, wherein the shorting structure comprises one or more vias connecting the antenna element and the ground plane element.

Clause 7. The antenna of any of clauses 1-6, wherein: the J-shaped surface of the antenna element lies within a plane of the antenna element defined by a longitudinal axis and a lateral axis, the longitudinal axis corresponds to a longer dimension of the antenna element and the lateral axis is perpendicular to the longitudinal axis, a hook-shaped portion of the J-shaped surface deviates from an edge of a linear portion of the J-shaped surface along the lateral axis, and the ground plane element is disposed in a plane parallel to the plane of the antenna element and displaced from the plane of the antenna element along an axis orthogonal to the longitudinal axis and the lateral axis.

Clause 8. The antenna of any of clauses 1-7, wherein the first segment of the ground plane element and the second segment of the ground plane element are connected to each other.

Clause 9. The antenna of any of clauses 1-8, wherein the antenna element comprises: a first layer having a same thickness as the ground plane element; and a second layer connected to the first layer, wherein the second layer increases a total thickness of the antenna element.

Clause 10. The antenna of any of clauses 1-9, further comprising a removal handle that includes an electrically conductive element connected to a hook-shaped portion of the J-shaped surface of the antenna element.

Clause 11. A hearing instrument comprising an antenna that comprises: an antenna element that is fed at an intermediate point between a first end of the antenna element and a second end of the antenna element, wherein the antenna element has a J-shaped surface; a ground plane element that has a first segment and a second segment, wherein: a surface of the first segment has substantially the same shape as the J-shaped surface of the antenna element, and the second segment connects a first end of the first segment to a second end of the first segment, thereby defining an opening through the ground plane element; a dielectric structure disposed between the antenna element and the ground plane element; and a shorting structure that connects the first end of the antenna element to the ground plane element.

Clause 12. The hearing instrument of clause 11, wherein a thickness of the antenna element is greater than a thickness of the ground plane element.

Clause 13. The hearing instrument of any of clauses 11-12, wherein an electrical length of the antenna element is approximately ¼ of a transmission wavelength of the antenna.

Clause 14. The hearing instrument of any of clauses 11-13, wherein a distance between the intermediate point and the shorting structure is selected to obtain 50 Ohm matching.

Clause 15. The hearing instrument of any of clauses 11-14, wherein an electric field direction of the antenna is oriented from the ground plane element to the antenna element and normal to a head of a user when the hearing instrument is worn by the user.

Clause 16. The hearing instrument of any of clauses 11-15, wherein the shorting structure comprises one or more vias connecting the antenna element and the ground plane element.

Clause 17. The hearing instrument of any of clauses 11-16, wherein:

the J-shaped surface of the antenna element lies within a plane of the antenna element defined by a longitudinal axis and a lateral axis, the longitudinal axis corresponds to a longer dimension of the antenna element and the lateral axis is perpendicular to the longitudinal axis, a hook-shaped portion of the J-shaped surface deviates from an edge of a linear portion of the J-shaped surface along the lateral axis, and the ground plane element is disposed in a plane parallel to the plane of the antenna element and displaced from the plane of the antenna element along an axis orthogonal to the longitudinal axis and the lateral axis.

Clause 18. The hearing instrument of any of clauses 11-17, wherein the first segment of the ground plane element and the second segment of the ground plane element are connected to each other.

Clause 19. The hearing instrument of any of clauses 11-18, wherein the antenna element comprises: a first layer having a same thickness as the ground plane element; and a second layer connected to the first layer, wherein the second layer increases a total thickness of the antenna element.

Clause 20. The hearing instrument of any of clauses 11-19, further comprising: a shell that defines an enclosure in which the antenna is positioned; and a battery compartment door that provides access to a battery compartment of the hearing instrument, wherein the battery compartment is defined such that a battery is insertable into the battery compartment through the opening defined by the ground plane element.

Clause 21. The hearing instrument of any of clauses 11-20, further comprising a removal handle that includes an electrically conductive element connected to a hook-shaped portion of the J-shaped surface of the antenna element.

Clause 22. The hearing instrument of any of clauses 11-21, further comprising: a shell that defines an enclosure in which the antenna is positioned; and a faceplate that covers an opening of the shell, wherein no part of the antenna protrudes from the faceplate.

Clause 23. The hearing instrument of any of clauses 11-22, further comprising: a shell that defines an enclosure in which the antenna is positioned, wherein when the hearing instrument is worn, a hook-shaped portion of the J-shaped surface of the antenna is oriented toward a posterior side of a head of a user.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the features or techniques described herein can be created, assembled, or performed in a different sequence, may be added, merged, or left out altogether (e.g., not all described acts or events are necessary for the practice of the techniques). For instance, this disclosure describes various examples of an antenna, these examples may be used individually or in combination. Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. An antenna for a hearing instrument, the antenna comprising:

an antenna element that is fed at an intermediate point between a first end of the antenna element and a second end of the antenna element, wherein the antenna element has a J-shaped surface;

a ground plane element that has a first segment and a second segment, wherein:

a surface of the first segment has substantially the same shape as the J-shaped surface of the antenna element, and the second segment connects a first end of the first segment to a second end of the first segment, thereby defining an opening through the ground plane element, wherein the first end of the first segment is aligned with the first end of the antenna element and the second end of the first segment is aligned with the second end of the antenna element;

a dielectric structure disposed between the antenna element and the ground plane element; and a shorting structure that connects the first end of the antenna element to the ground plane element.

2. The antenna of claim 1, wherein a thickness of the antenna element is greater than a thickness of the ground plane element.

3. The antenna of claim 1, wherein an electrical length of the antenna element is approximately ¼ of a transmission wavelength of the antenna.

4. The antenna of claim 1, wherein a distance between the intermediate point and the shorting structure is selected to obtain 50 Ohm matching.

5. The antenna of claim 1, wherein an electric field direction of the antenna is primarily oriented from the ground plane element to the antenna element and normal to a head of a user when the hearing instrument is worn by the user.

6. The antenna of claim 1, wherein the shorting structure comprises one or more vias connecting the antenna element and the ground plane element.

7. The antenna of claim 1, wherein:

the J-shaped surface of the antenna element lies within a plane of the antenna element defined by a longitudinal axis and a lateral axis, the longitudinal axis corresponds to a longer dimension of the antenna element and the lateral axis is perpendicular to the longitudinal axis, a hook-shaped portion of the J-shaped surface deviates from an edge of a linear portion of the J-shaped surface along the lateral axis, and the ground plane element is disposed in a plane parallel to the plane of the antenna element and displaced from the plane of the antenna element along an axis orthogonal to the longitudinal axis and the lateral axis.

8. The antenna of claim 1, wherein the first segment of the ground plane element and the second segment of the ground plane element are connected to each other.

9. The antenna of claim 1, wherein the antenna element comprises:

a first layer having a same thickness as the ground plane element; and a second layer connected to the first layer, wherein the second layer increases a total thickness of the antenna element.

10. The antenna of claim 1, further comprising a removal handle that includes an electrically conductive element connected to a hook-shaped portion of the J-shaped surface of the antenna element, the electrically conductive element being adapted to shorten a size of the hook-shaped portion of the antenna element.

11. The antenna of claim 1, wherein the J-shaped surface of the antenna element includes a linear portion and a hook-shaped portion, the hook-shaped portion including a combination of curved and linear segments.

12. A hearing instrument comprising an antenna that comprises:

an antenna element that is fed at an intermediate point between a first end of the antenna element and a second end of the antenna element, wherein the antenna element has a J-shaped surface;

a ground plane element that has a first segment and a second segment, wherein:

a surface of the first segment has substantially the same shape as the J-shaped surface of the antenna element, and the second segment connects a first end of the first segment to a second end of the first segment, thereby defining an opening through the ground plane element, wherein the first end of the first segment is aligned with the first end of the antenna element and the second end of the first segment is aligned with the second end of the antenna element;

a dielectric structure disposed between the antenna element and the ground plane element; and a shorting structure that connects the first end of the antenna element to the ground plane element.

13. The hearing instrument of claim 12, wherein a thickness of the antenna element is greater than a thickness of the ground plane element.

14. The hearing instrument of claim 12, wherein an electrical length of the antenna element is approximately ¼ of a transmission wavelength of the antenna.

15. The hearing instrument of claim 12, wherein a distance between the intermediate point and the shorting structure is selected to obtain 50 Ohm matching.

16. The hearing instrument of claim 12, wherein an electric field direction of the antenna is oriented from the ground plane element to the antenna element and normal to a head of a user when the hearing instrument is worn by the user.

17. The hearing instrument of claim 12, wherein the shorting structure comprises one or more vias connecting the antenna element and the ground plane element.

18. The hearing instrument of claim 12, wherein:

the J-shaped surface of the antenna element lies within a plane of the antenna element defined by a longitudinal axis and a lateral axis, the longitudinal axis corresponds to a longer dimension of the antenna element and the lateral axis is perpendicular to the longitudinal axis, a hook-shaped portion of the J-shaped surface deviates from an edge of a linear portion of the J-shaped surface along the lateral axis, and the ground plane element is disposed in a plane parallel to the plane of the antenna element and displaced from the plane of the antenna element along an axis orthogonal to the longitudinal axis and the lateral axis.

19. The hearing instrument of claim 12, wherein the first segment of the ground plane element and the second segment of the ground plane element are connected to each other.

20. The hearing instrument of claim 12, wherein the antenna element comprises:

a first layer having a same thickness as the ground plane element; and a second layer connected to the first layer, wherein the second layer increases a total thickness of the antenna element.

21. The hearing instrument of claim 12, further comprising:

a shell that defines an enclosure in which the antenna is positioned; and a battery compartment door that provides access to a battery compartment of the hearing instrument, wherein the battery compartment is defined such that a battery is insertable into the battery compartment through the opening defined by the ground plane element.

22. The hearing instrument of claim 12, further comprising a removal handle that includes an electrically conductive element connected to a hook-shaped portion of the J-shaped surface of the antenna element.

23. The hearing instrument of claim 12, further comprising:

a shell that defines an enclosure in which the antenna is positioned; and a faceplate that covers an opening of the shell, wherein no part of the antenna protrudes from the faceplate.

24. The hearing instrument of claim 12, further comprising:

a shell that defines an enclosure in which the antenna is positioned, wherein when the hearing instrument is worn, a hook-shaped portion of the J-shaped surface of the antenna element is oriented toward a posterior side of a head of a user.

* * * * *